(12) United States Patent
Wei et al.

(10) Patent No.: US 9,946,753 B2
(45) Date of Patent: Apr. 17, 2018

(54) METHOD AND SYSTEM FOR DOCUMENT INDEXING AND DATA QUERYING

(71) Applicant: Alibaba Group Holding Limited, George Town (KY)

(72) Inventors: Lei Wei, Beijing (CN); Jiaxiang Shen, Hangzhou (CN)

(73) Assignee: Alibaba Group Holding Limited (KY)

( * ) Notice: Subject to any disclaimer, the term of this patent is extended or adjusted under 35 U.S.C. 154(b) by 85 days.

(21) Appl. No.: 14/973,395

(22) Filed: Dec. 17, 2015

(65) Prior Publication Data

US 2016/0171052 A1   Jun. 16, 2016

Related U.S. Application Data

(63) Continuation of application No. 12/804,441, filed on Jul. 20, 2010, now Pat. No. 9,275,128.

(30) Foreign Application Priority Data

Jul. 23, 2009  (CN) .......................... 2009 1 0151487

(51) Int. Cl.
  G06F 17/30  (2006.01)
(52) U.S. Cl.
  CPC .. *G06F 17/30486* (2013.01); *G06F 17/30011* (2013.01); *G06F 17/30321* (2013.01); *G06F 17/30377* (2013.01); *G06F 17/30613* (2013.01); *G06F 17/30619* (2013.01); *G06F 17/30669* (2013.01)
(58) Field of Classification Search
  None
  See application file for complete search history.

(56) References Cited

U.S. PATENT DOCUMENTS

| | | | |
|---|---|---|---|
| 5,235,654 A | 8/1993 | Anderson et al. | |
| 6,128,613 A | 10/2000 | Wong et al. | |
| 6,263,335 B1 | 7/2001 | Paik et al. | |
| | (Continued) | | |

FOREIGN PATENT DOCUMENTS

| | | |
|---|---|---|
| JP | H07105237 | 4/1995 |
| JP | H10312395 | 11/1998 |
| | (Continued) | |

OTHER PUBLICATIONS

Kontinen et al. "On second-order monadic groupoidal quantifiers." Logic, Language, Information and Computation. Springer Berlin Heidelberg, 2008. 238-248.

*Primary Examiner* — Ashish K Thomas
*Assistant Examiner* — Mellissa M Ohba
(74) *Attorney, Agent, or Firm* — Van Pelt, Yi & James LLP

(57) ABSTRACT

Generating a document index comprises: obtaining a document to be indexed; determining whether each monadic partition obtained from the document is a filter character and if so, forming a polynary partition with the monadic partition and at least one adjacent monadic partition and indexing the polynary partition, otherwise, indexing the monadic partition. Querying data comprising: receiving a data query, determining whether each monadic partition obtained from the data query is a filter character and if so, forming a polynary partition with the monadic partition and at least one adjacent monadic partition and using the polynary partition to obtain search results, otherwise, using the monadic partition to obtain search results; and combining search results to form a final query search result.

12 Claims, 8 Drawing Sheets

(56) References Cited

U.S. PATENT DOCUMENTS

| | | |
|---|---|---|
| 6,631,373 B1 | 10/2003 | Otani et al. |
| 6,640,225 B1 | 10/2003 | Takishita et al. |
| 6,697,801 B1 | 2/2004 | Eldredge et al. |
| 7,039,636 B2 | 5/2006 | Tada et al. |
| 7,254,580 B1 | 8/2007 | Gharachorloo et al. |
| 7,458,022 B2 | 11/2008 | Ramarao |
| 7,487,138 B2 | 2/2009 | Borthakur et al. |
| 7,555,431 B2 | 6/2009 | Bennett |
| 7,617,249 B2 | 11/2009 | Thusoo et al. |
| 7,624,007 B2 | 11/2009 | Bennett |
| 7,860,706 B2 | 12/2010 | Abir |
| 2001/0056445 A1 | 12/2001 | Meystel et al. |
| 2002/0022953 A1 | 2/2002 | Bertolus et al. |
| 2003/0009447 A1 | 1/2003 | Murray et al. |
| 2003/0059115 A1 | 3/2003 | Nakagawa |
| 2003/0120649 A1 | 6/2003 | Uchino et al. |
| 2003/0182310 A1 | 9/2003 | Charnock et al. |
| 2003/0212674 A1 | 11/2003 | Nakagawa |
| 2003/0233365 A1 | 12/2003 | Schmit et al. |
| 2005/0086224 A1 | 4/2005 | Franciosa et al. |
| 2007/0027854 A1 | 2/2007 | Rao et al. |
| 2007/0106492 A1 | 5/2007 | Kim |
| 2007/0233460 A1 | 10/2007 | Lancaster et al. |
| 2008/0077570 A1 | 3/2008 | Tang et al. |
| 2008/0155239 A1 | 6/2008 | Chowdhury et al. |
| 2009/0210855 A1 | 8/2009 | Ramanathan |
| 2009/0297044 A1 | 12/2009 | Kokumai et al. |
| 2010/0235164 A1 | 9/2010 | Todhunter et al. |

FOREIGN PATENT DOCUMENTS

| | | |
|---|---|---|
| JP | 2003208433 | 7/2003 |
| JP | 2009104669 | 5/2009 |
| WO | 0208963 | 1/2002 |

METHOD AND SYSTEM FOR DOCUMENT INDEXING AND DATA QUERYING

CROSS REFERENCE TO OTHER APPLICATIONS

This application is a continuation of co-pending U.S. patent application Ser. No. 12/804,441, entitled METHOD AND SYSTEM FOR DOCUMENT INDEXING AND DATA QUERYING filed Jul. 20, 2010 which is incorporated herein by reference for all purposes, which claims priority to People's Republic of China Patent Application No. 200910151487.2 entitled DOCUMENT INDEXING METHOD, DATA QUERY METHOD AND SERVER FOR SEARCH ENGINE filed Jul. 23, 2009 which is incorporated herein by reference for all purposes.

FIELD OF THE INVENTION

The present invention relates to the technical field of information technology and, in particular, to document indexing and data querying.

BACKGROUND OF THE INVENTION

A search engine is designed to search for information on the World Wide Web. It often collects information on the Internet through specific computer programs according to certain policies. A search engine also provides a retrieval service to users. That is, it organizes and processes information that it collects, and it displays the processed information to users.

Web search engines typically work by storing information about many web pages. These pages are retrieved by information capture systems referred to as Web crawlers (sometimes also known as spiders). A Web crawler is a computer program that browses the World Wide Web in a methodical, automated manner or in an orderly fashion. This process is called Web crawling or spidering. Most Web crawlers are used to create a copy of all the visited pages for later processing by a search engine that will index the downloaded pages to provide fast searches. In general, a Web crawler starts with a list of URLs to visit, referred to as the seeds. As the crawler visits these URLs, it identifies all the hyperlinks in the page (referred to as the crawl frontier) and adds them to the list of URLs to visit. URLs from the frontier are recursively visited according to a set of policies. Web pages are captured in this crawling process along with the hyperlinks. The web pages are called web page snapshots. Because hyperlinks are widely used on the Internet, theoretically, most of the web pages can be collected starting from certain web pages. When the captured web pages are processed, keywords are extracted and indexes are established in order to provide search services. Then, when a user enters a query into a search engine (typically by using key words), the search engine examines its index and provides a listing of best-matching Web page URLs according to its criteria, usually with a short summary containing the document title and sometimes part of the text. The index is built from the information stored with the data and the method by which the information is indexed. The usefulness of a search engine depends on the relevance of the result set it gives back. While there may be many pages that include a particular word or phrase, some pages may be more relevant, popular, or authoritative than others. Most search engines employ methods to rank the results to provide the "best" results first. How a search engine decides which pages are the best matches and what order the results should be shown in, varies widely from one search engine to another.

In particular, for a search engine with the capacity to search Chinese characters, a Chinese character partitioning operation is needed during indexing and querying processes. The conventional Chinese partitioning method uses a monadic partition method in which each Chinese character in a sentence is taken as a single unit. For example, after a monadic partition of the phrase of "中国股市" ("China country stock market," also translated as "Chinese stock market"), the result set contains four single characters: "中," ("Chinese,") "国," ("country,") "股," ("stock,") and "市" ("market,") respectively. Here, the appearance probability for the character "市" ("market") in a single search engine server that indexes 6 million documents is as high as 93%. Therefore, the query of "市" ("market") will consume a large portion of the search engine server's resources during the "中国股市" ("Chinese stock market") query if a monadic partition method is used. In order to avoid such a situation, a list of high-frequency characters is pre-stored in the search engine and high-frequency characters are filtered before conducting the query. Such high-frequency characters are referred to as "filter characters." Using the same example, a query of "中国股市" ("Chinese stock market") will be simplified as a query of "中国股" ("Chinese stock") in order to skip the high-frequency character "市" ("market") in a query.

However, since indexing and querying are carried out by omitting high-frequency characters in the conventional monadic partition method, the result set may not be accurate. Again, using "中国股市" ("Chinese stock market") as an example, because "市" ("market") is omitted in the query, the query result set may contain a large number of "中国股民" ("Chinese stock investors") and "中国股票" ("Chinese stock shares"), etc., which contain "中国股" ("Chinese stock"), but do not accurately match the user's query. Therefore, more accurate and more efficient indexing and querying techniques are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time, or a specific component that is manufactured to perform the task. As used herein, the term "processor" refers to one or more devices, circuits, and/or processing cores configured to process data, such as computer program instructions.

A detailed description of one or more embodiments of the invention is provided below, along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
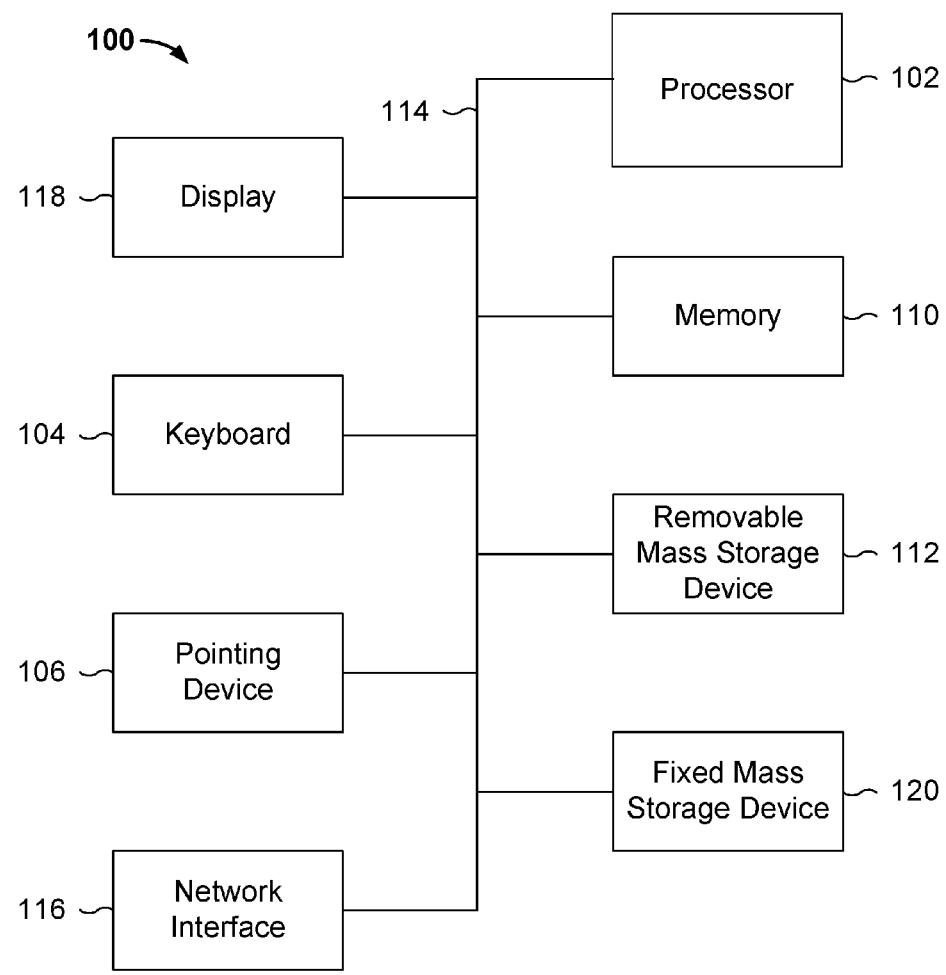
FIG. 1A is a functional diagram illustrating an embodiment of a programmed computer system for providing techniques for indexing and querying document data.

FIG. 1A is a functional diagram illustrating an embodiment of a programmed computer system for providing techniques for indexing and querying document data. As will be apparent, other computer system architectures and configurations can be used to perform techniques for indexing and querying document data. Computer system 100, which includes various subsystems as described below, includes at least one microprocessor subsystem (also referred to as a processor or a central processing unit, CPU) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data and the output and display of data on output devices (e.g., display 118). In some embodiments, processor 102, for example, in communication with a memory 110 (or other computer readable storage medium element(s)/device(s)), includes and/or is used to implement techniques for indexing and querying document data as described herein.

Processor 102 is coupled bidirectionally with memory 110, which can include a first primary storage, typically a random access memory (RAM), and a second primary storage area, typically a read-only memory (ROM). As is well known in the art, primary storage can be used as a general storage area and as scratch-pad memory and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable computer-readable storage media, described below, depending on whether, for example, data access needs to be bidirectional or unidirectional. For example, processor 102 can also directly and very rapidly retrieve and store frequently needed data in a cache memory (not shown).

A removable mass storage device 112 provides additional data storage capacity for the computer system 100 and is coupled either bidirectionally (read/write) or unidirectionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, trackball, or tablet and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card, or similar device, and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network, such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. A computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include machine code, as produced, for example, by a compiler, or files containing higher level code (e.g., script) that can be executed using an interpreter.

The computer system shown in FIG. 1A is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 1B:
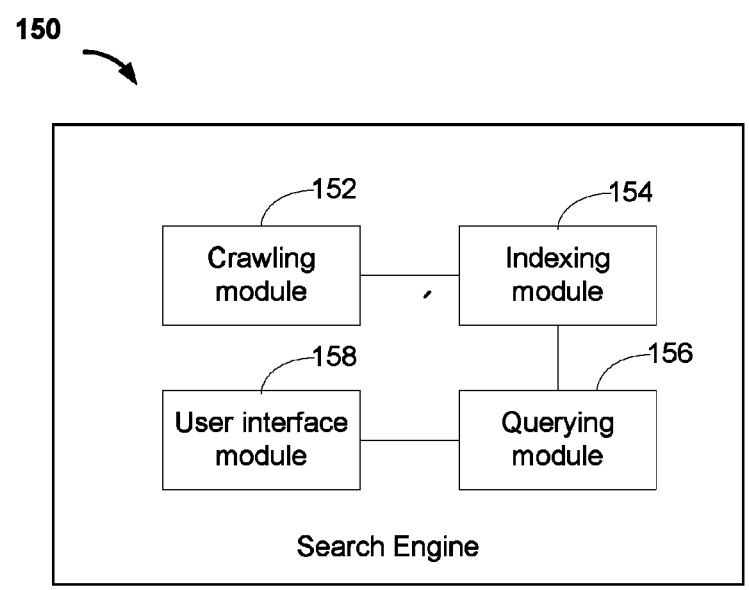
FIG. 1B is a schematic diagram illustrating a search engine deploying an embodiment of the document querying and data indexing system.

FIG. 1B is a schematic diagram illustrating a search engine deploying an embodiment of the document querying and data indexing system. Search engine 150 may be implemented using one or more computing devices such as a personal computer, a server computer, a handheld or portable device, a flat panel device, a multi-processor system, a microprocessor based system, a set-top box, a programmable consumer electronic device, a network PC, a mini-computer, a large-scale computer, a special purpose device, a distributed computing environment including any of the foregoing systems or devices, or other hardware/software/firmware combination that includes one or more processors and memory coupled to the processors and configured to provide the processors with instructions.

In the example shown, a search engine 150 includes: a crawling module 152, an indexing module 154, a querying module 156, and a user interface module 158. The crawling module is adapted to find and collect Web page information by roaming on the Internet using a Web crawler. The indexing module is adapted to extract an index entry from a Web page collected by the crawling module. The index is used to represent a document, and it is stored in an index table of a document database. The querying module is adapted to retrieve a document in the index database according to the query of a user, sort the output results, and output reasonably output feedback information according to a user's query requirement. The interface module is adapted to receive the query request of a user and return the query results to the user. The following embodiments of the invention mainly describe the processes of the document indexing and data querying functions of the search engine.

Figure 2:
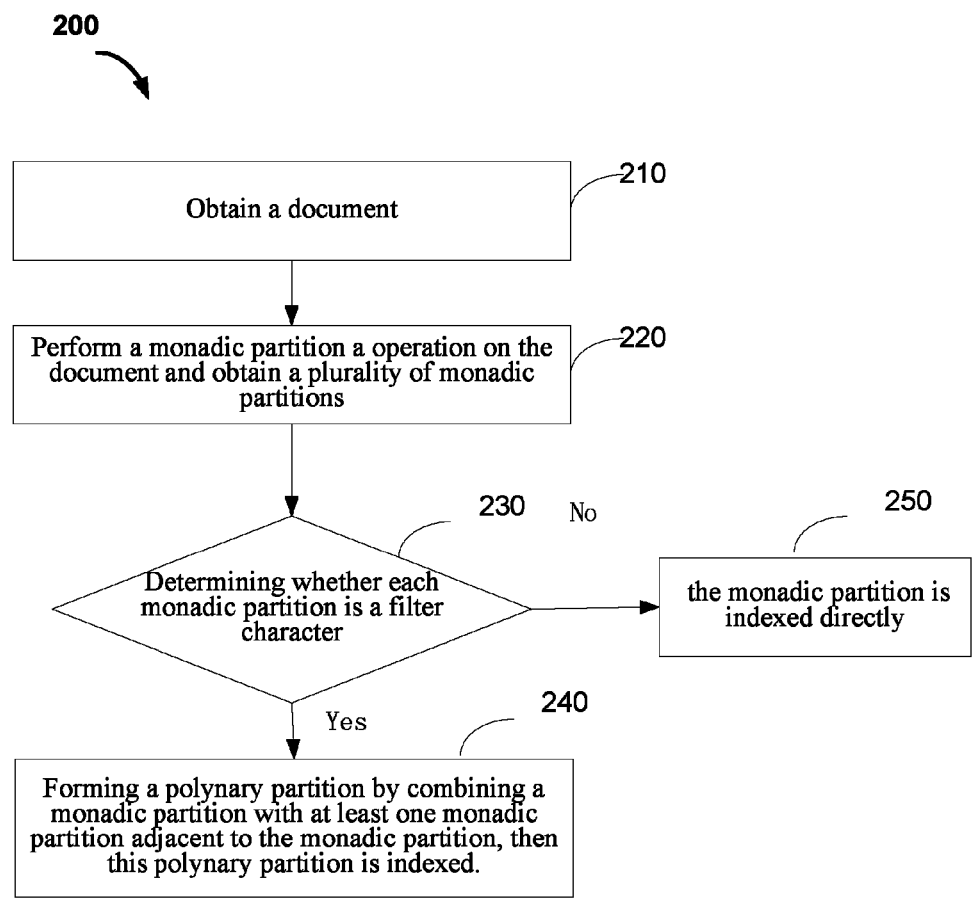
FIG. 2 is a flow chart illustrating an embodiment of a document indexing process.

FIG. 2 is a flow chart illustrating an embodiment of a document indexing process.

At 210, a document is obtained. In this example, the document, such as a Web page, is obtained from the Internet by a Web crawler of a search engine. The document is then stored in data storage which is part of or connected to a search engine. Example data storage can be a plurality of databases, a plurality of disks, etc. The search engine will retrieve the document from the data storage before it is indexed. In some embodiments, the document is in a character based language such as Chinese.

At 220, a monadic partition operation is performed on the document. In other words, each character forms an individual partitioning unit.

At 230, characters in the monadic partitions are compared with a filter characters list to determine whether these characters are filter characters.

A filter character is a high-frequency character that is omitted by a search engine during a query process. Due to the high-frequency appearance of filter characters in the documents stored in the search engine, large amounts of system resources would be consumed if the filter characters were included in the query. Therefore, statistically high-frequency characters are predetermined and stored in a filter characters list in the search engine. Before performing indexing or query operation, a character in a monadic partition is compared with the characters in the filter characters list to determine whether this character is a filter character. For example, "市" ("market") in "中国股市" ("Chinese stock market") is found in the filter characters list of a search engine; thus, "市" ("market") is a filter character and will be omitted from a query or an indexing operation.

The monadic partition operations of the document are carried out repeatedly. A series of monadic partitions are obtained after the operations. Each of the monadic partitions is compared against the filter characters list to determine whether it is a filter character. If the document to be indexed has only one character that is a high-frequency character (also referred to as a filter character), such as "市" ("market"), no index will be established for the document.

At 240, if a character in a monadic partition is a filter character, a polynary partition (also referred to as N-ary partition) is formed by combining the monadic partition with at least one monadic partition adjacent to the monadic partition, and then the polynary partition is indexed. As used herein, a polynary partition refers to a partition that is formed by at least two adjacent monadic partitions.

In some embodiments, a binary partition is formed by combining a monadic partition with its adjacent monadic partition. Assuming a monadic partition P is determined to be a high-frequency filter character, if P is the first monadic partition in the document, a binary partition is formed by combining P with its subsequent monadic partition; if P is the last monadic partition in the document, a binary partition is formed by combining P with its precedent monadic partition; and if P is neither the first monadic partition nor the last monadic partition in the document but appears somewhere in the middle of the document, two binary partitions are formed by combining P with the precedent monadic partition and the subsequent monadic partition respectively. The binary partition(s) is(are) indexed. For example, "我" ("I") is a high-frequency filter character and it is a monadic partition. If it is the first monadic partition in the document, it will combine with a subsequent monadic partition such as "的" ("of," a possessive particle) to form a binary partition "我的" ("my") to be indexed.

Similarly, in some embodiments, a ternary partition can be formed. For example, a ternary partition "中国人" ("China country person" or "Chinese") is formed from three monadic partitions "中" ("China"), "国" ("country"), and "人" ("person"). A quaternary partition can be formed in the same way and so on.

At 250, if a character in a monadic partition is not a filter character, this character is indexed directly.

240 and 250 may be repeated until all the monadic partitions in the document are processed. Process 200 may be repeated for multiple documents to create a search index.

Figure 3:
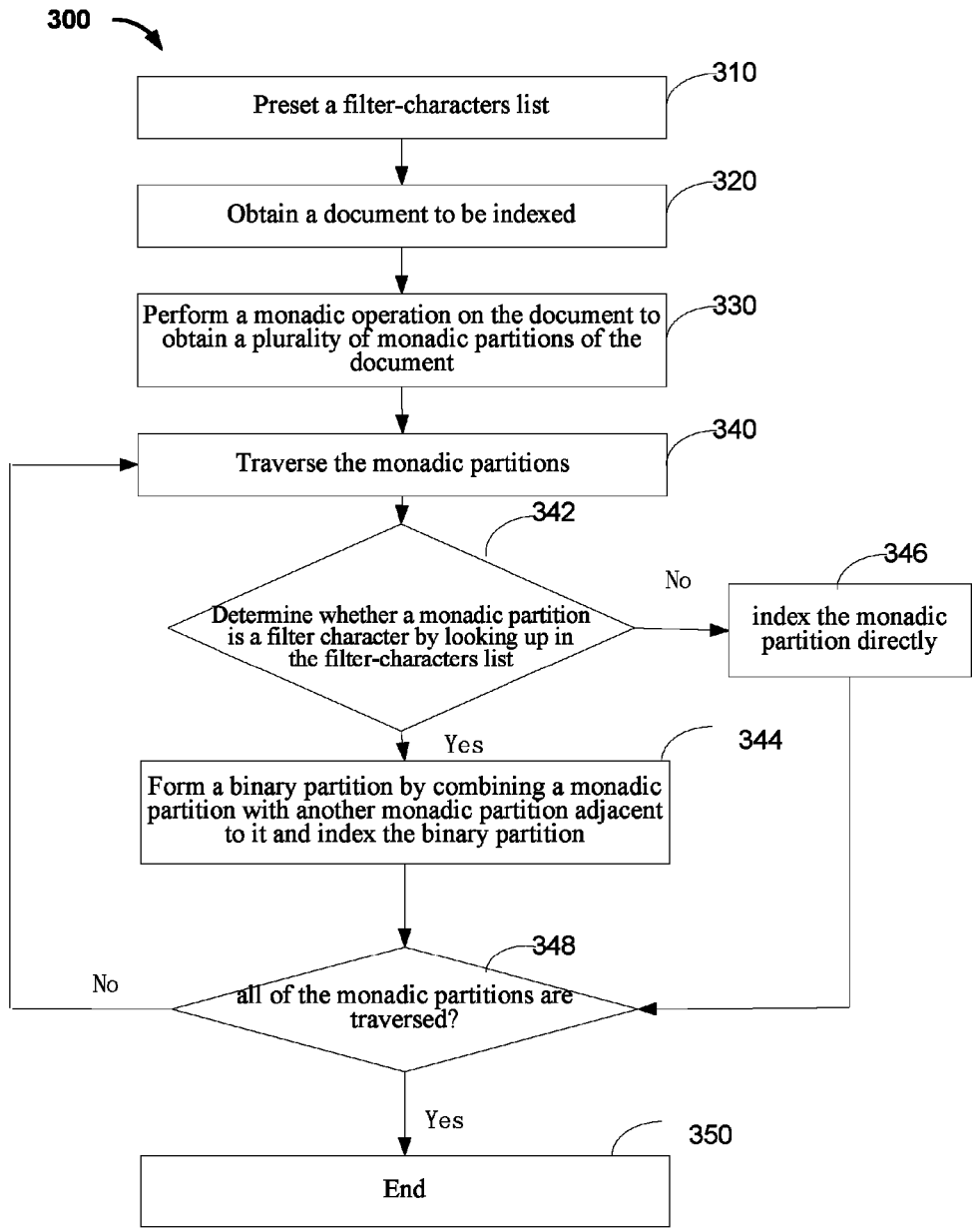
FIG. 3 is a flow chart illustrating another embodiment of a document indexing process.

FIG. 3 is a flow chart illustrating another embodiment of a document indexing process. In this embodiment, a binary partition is used to demonstrate the indexing process of a document. Other polynary partitions such as tertiary partition or quaternary partition can be implemented in a similar way.

At 310, a filter characters list is predetermined. In some embodiments, a character's frequency of appearance is calculated from a large set of sample Internet documents. The criteria for determining whether a character is a filter character and whether it should be included in the filter characters list may be set according to the character's appearance frequency in the sample set of documents. For example, a sample Internet documents set consists of six million documents. Monadic partition operations are carried out in each of these six million documents. The characters in the monadic partitions are sorted according to their appearance frequency in these documents, and a high-frequency-characters list is constructed by adding the X (e.g., 100) characters that have the highest appearance frequency into the list. The filter characters list can be adjusted dynamically over time as needed; for example, when additional documents are added to the sample set or when a different sample set is obtained.

At 320, a document to be indexed is obtained.

At 330, a monadic partition operation is performed on the document to obtain a plurality of monadic partitions of the document.

At 340, the monadic partitions are traversed; that is, processes 342 to 346 are carried out for each monadic partition in the document.

At 342, a monadic partition of the document is looked up in the filter character list to determine whether it is a filter character.

At 344, if a monadic partition is a filter character, a binary partition is formed by combining the monadic partition with a monadic partition adjacent to it, and this binary partition is indexed using standard indexing techniques such as keyword indexing, hash value indexing, etc.

At 346, if a monadic partition is not a filter character, this monadic partition is indexed directly.

At 348, if all the monadic partitions are traversed, the indexing process for the document is completed. If so, the process ends at 350. Else, control is transferred to 340 and the next nomadic partition is processed.

In some embodiments, a monadic partition in the document is processed according to the following exemplary pseudo code:

The indexes established by the process above do not contain index entries for high-frequency characters alone; instead, binary partitions are formed from high-frequency characters and characters adjacent to them, and these binary partitions are indexed. Therefore, the accuracy of the subsequent data query will be much improved compared to conventional methods.

In various embodiments, documents are queried using the indexes established by the above embodiments of document indexing methods.

Figure 4:
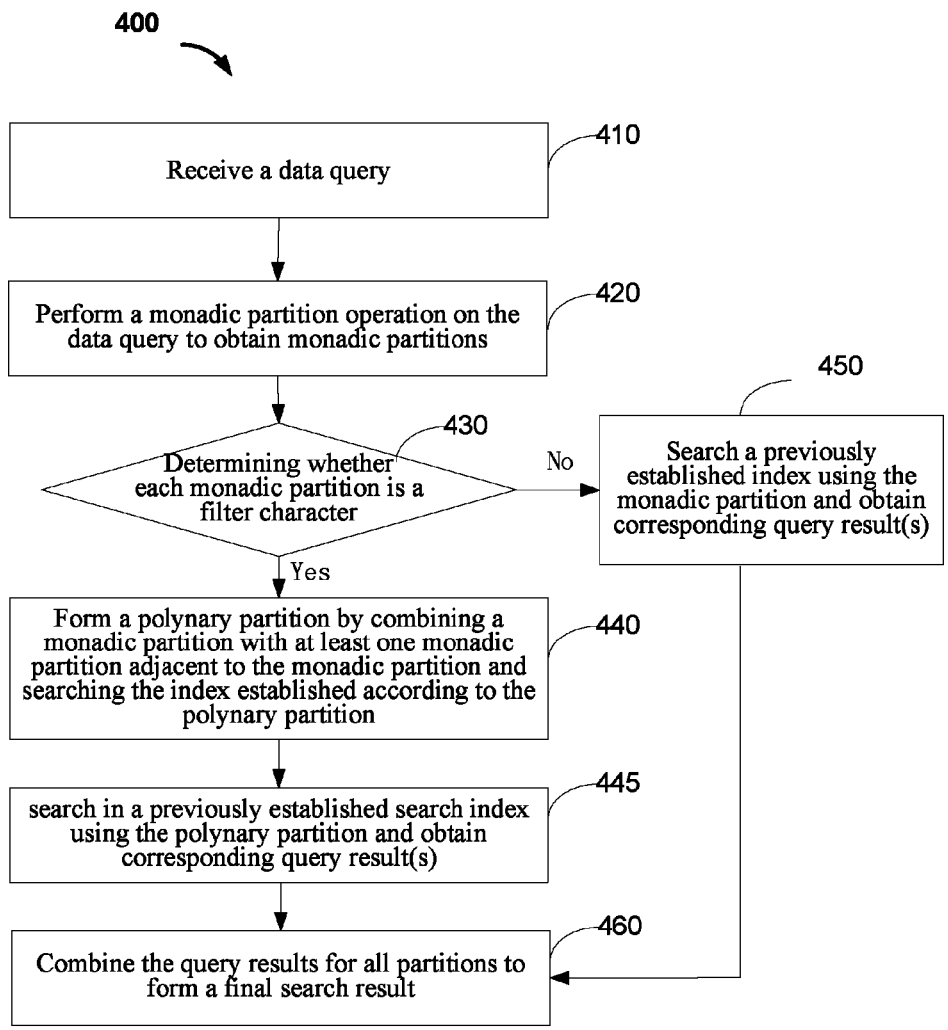
FIG. 4 is a flowchart illustrating an embodiment of a search engine data query process.

FIG. 4 is a flowchart illustrating an embodiment of a search engine data query process.

At 410, a data query is received. For example, the query is input by a user from an Internet Website and is received by the search engine.

At 420, a monadic partitioning operation is performed on the data query to obtain a plurality of monadic partitions.

At 430, each monadic partition is compared with a filter character list to determine whether it is a filter character. If so, control is transferred to 440. Else, control is transferred to 450.

At 440, if a monadic partition is a filter character, a polynary partition is formed on a monadic partition, combining it with at least one adjacent monadic partition to form a polynary partition.

At 445, a previously established index is searched using this polynary partition and the query result is obtained. For example, an index previously established by an indexing process similar to 200 or 300 is searched using conventional techniques such as keyword matching (where the polynary partition is used as the search keyword) to identify documents that match the query.

In some embodiments, a binary partition is formed by combining a monadic partition and its adjacent monadic partition. Assuming monadic partition P is determined to be a high-frequency filter character, if P is the first monadic partition in the document, a binary partition is formed by combining P with its subsequent monadic partition; if P is not the first monadic partition in the document, a binary partition is formed by combining P with its precedent monadic partition.

At 450, if a monadic partition is not a filter character, a previously established index is searched for this monadic partition and a query result is obtained.

At 460, query results from monadic partitions and polynary partitions are combined to form a final search result, which is optionally presented to the user.

Figure 5:
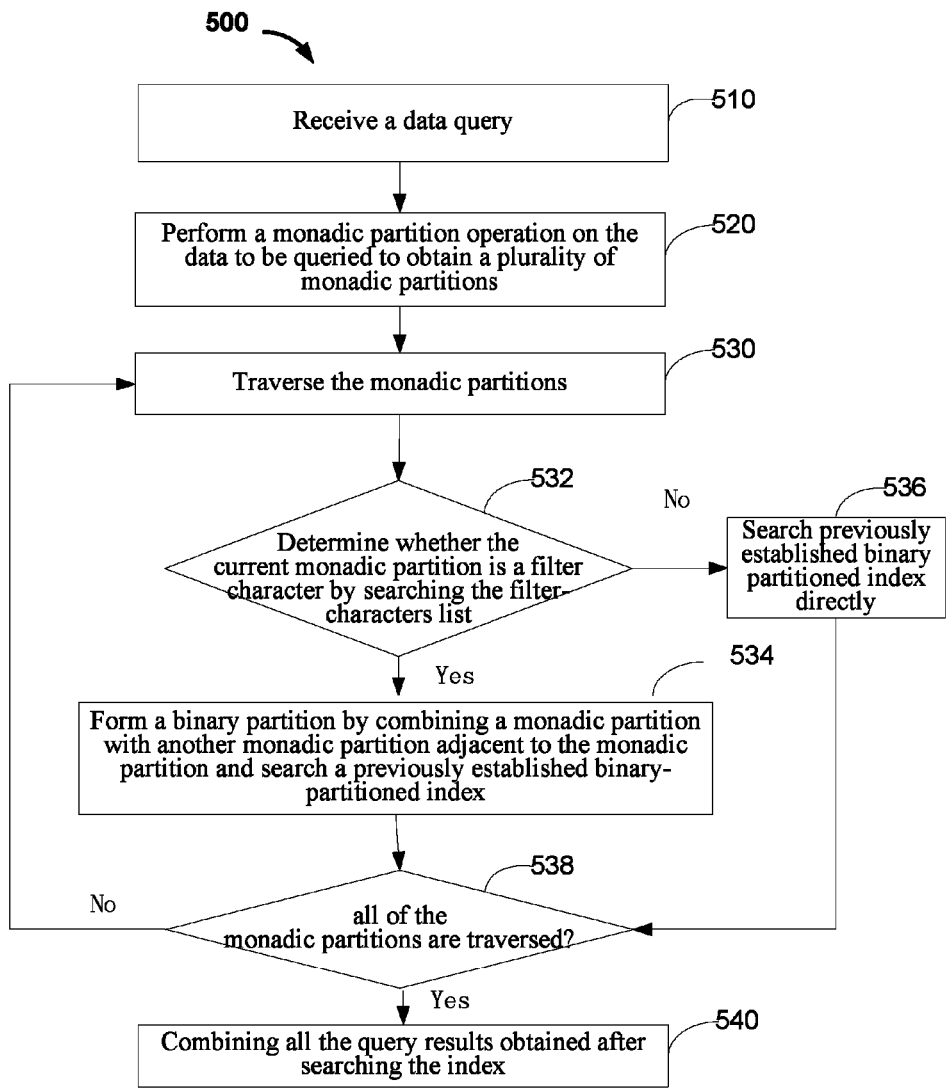
FIG. 5 is a flowchart illustrating another embodiment of a search engine data query process.

FIG. 5 is another flowchart illustrating an embodiment of a search engine data query process. In this embodiment, binary and tertiary partition is used to demonstrate the

```
Token token=getCurrentToken( );                    // obtaining the current partition
If (isFreqWord(token))                             // if the current partition is a high-frequency
                                                   word
{
   Token token2 = mergeToken (prevToken,           //forming a new word with the
token);
                                                   //previous partition
   indexToken(token2);                             // establishing an index
   Token token3=mergeToken (nextToken, token);    // forming a new word with the
                                                   //subsequent partition
      indexToken (token3);                         // establishing an index
}
else
      indexToken(token);                           //establishing an index directly if it
                                                   // is not a high-frequency word
``` querying process. However, polynary partitions other than the binary partitions can be used in a similar way.

At 510, a query is received.

At 520, a monadic partition operation is performed on the query to obtain a plurality of monadic partitions.

At 530, the monadic partitions of the query are traversed; in other words, 532-536 are carried out for each monadic partition in the document.

At 532, a monadic partition of the document is compared with a filter character list to determine whether it is a filter character.

At 534, if a monadic partition is a filter character, a binary partition is formed by combining the monadic partition with at least one other monadic partition adjacent to it, and an index is searched for this binary partition and a query result is obtained.

At 536, if a monadic partition is not a filter character, an index is searched for this monadic partition and a query result is obtained.

In some embodiments, after 538 is completed, the binary partitions are further processed in a way that is similar to the processing of the monadic partitions. It is determined whether each binary partition is a filter word or phrase based on a previously established list that includes binary partitions, and if so, no additional search is needed. Else, in some embodiments, one or more new tertiary partitions are formed based on the binary partition and one or more adjacent monadic partitions; in some embodiments, one or more new quaternary partitions are formed based on the binary partition and one or more adjacent binary partitions.

At 540, query results for all partitions are combined. The query results are optionally returned and displayed to a user according to a preset condition; for example, the top 20 unique results are returned.

In some embodiments, a monadic partitions of the query is processed according to the following exemplary pseudo code:

Chinese based search engine, a monadic partition refers to each Chinese character in a document or in a query. The monadic partitions obtained by carrying out partition operations on a data query "中国股市" ("Chinese stock market") are "中" ("Chinese"), "国" ("nation"), "股" ("stock"), and "市" ("market"). Similarly, in an English based search engine, the query of "Chinese Stock Market" can be partitioned into monadic partitions "Chinese," "Stock," and "Market." If "stock" is a high frequency word in a filter word list established according to the frequencies of appearance of words in a set of documents, "stock" will combine with "Chinese" and "Market," respectively, to form two new polynary partitions: "Chinese Stock" and "Stock market." Therefore, the final partitions of the query are "Chinese," "Chinese Stock," "Stock Market," and "Market," respectively. When the phrase "Chinese Stock Market" is queried by a search engine, the search engine will query "Chinese," "Chinese Stock," "Stock Market," and "Market" and the query results are combined and unique entries from the combined query result are displayed to the user.

Corresponding to the embodiments of the document indexing and data query processes above, the application further provides embodiments of document index systems and data query systems. Example implementations of embodiments of systems for document indexing and data querying are described below. The systems are described to include a number of modules or units. The modules or units can be implemented as software components executing on one or more processors, or as hardware such as programmable logic devices and/or Application Specific Integrated Circuits designed to perform certain functions or combinations thereof. In some embodiments, the modules/units/subunits can be embodied by a form of software products which can be stored in a nonvolatile storage medium (such as optical disk, flash storage device, mobile hard disk, etc.), including a number of instructions for making a computer device (such as personal computers, servers, network equip-

```
Token token = getCurrentToken( );            //obtaining the current partition
If (isFreqWord(token))                       //if the current partition is a high-frequency
                                             //filter character
{
    Token token2;
    If (isFirstWord(token))
        token2 = mergeToken (nextToken, token);   // backward combining if
                                                  //the token is at the beginning
                                                  //of a sentence
    else
        token2=mergeToken(prevToken, token);      // forward combining if
                                                  //the token is not at the
                                                  //beginning of a sentence
    doTokenSearch(token2);                   //query the new combined partition
}
else
    doTokenSearch(token);                    // if it is not a high-frequency filter character,
                                             // querying directly
```

For the queries carried out according to the embodiments above, it is guaranteed that no high-frequency character exists in the index alone since all the high-frequency characters are combined with other monadic partitions to form polynary partitions before the index is established. Thus, search engine resources are conserved since high-frequency character searching is avoided, and query result accuracy is also improved.

Although the embodiments use Chinese characters as indexing and querying examples, the method applies to search engines that carry out indexing and querying operations in languages other than Chinese. For example, in a ment, etc.) implement the methods described in the embodiments of the present invention. The modules or units may be implemented on a single device or distributed across multiple devices. The functions of the modules or units may be merged into one another or further split into multiple sub-modules or sub-units.

Figure 6:
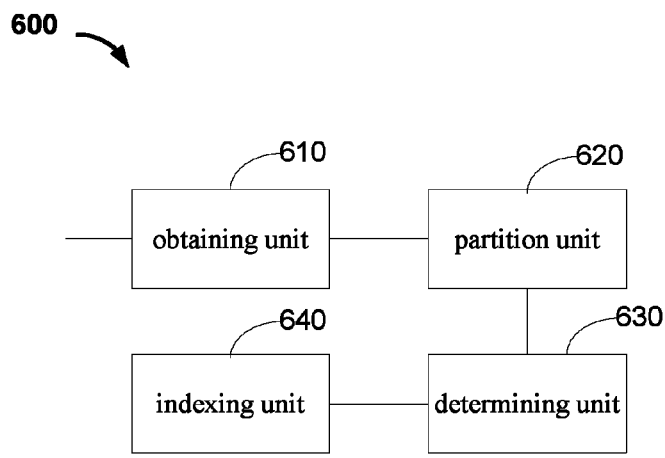
FIG. 6 is a block diagram illustrating an embodiment of a system configured to index documents.

FIG. 6 is a block diagram illustrating an embodiment of a system configured to index documents. System 600 may be implemented using one or more computing devices such as a personal computer, a server computer, a handheld or portable device, a flat panel device, a multi-processor system, a microprocessor based system, a set-top box, a programmable consumer electronic device, a network PC, a minicomputer, a large-scale computer, a special purpose device, a distributed computing environment including any of the foregoing systems or devices, or other hardware/software/firmware combination that includes one or more processors and memory coupled to the processors and configured to provide the processors with instructions.

In the example shown, system 600 includes an obtaining unit 610, a partition unit 620, a determining unit 630, and an indexing unit 640. The obtaining unit 610 is adapted to obtain a document to be indexed. The partition unit 620 is adapted to carry out a partition operation on the document obtained by the obtaining unit 610 so as to obtain monadic partitions. The determining unit 630 is adapted to determine whether each monadic partition is a filter character. If a monadic partition is a filter character, the indexing unit 640 is adapted to form a polynary partition by combining the monadic partition and at least one monadic partition adjacent to the monadic partition, and then establish an index for the polynary partition. If a monadic partition is not a filter character, the indexing unit 640 is adapted to establish an index for the monadic partition directly.

Figure 7:
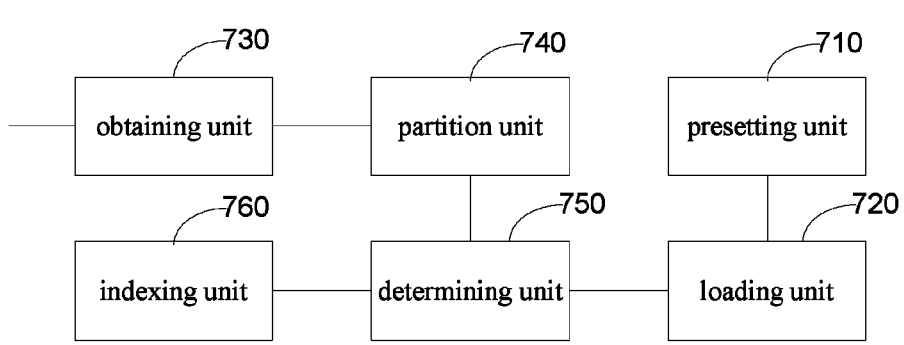
FIG. 7 is a block diagram illustrating another embodiment of a system configured to index documents.

FIG. 7 is a block diagram illustrating another embodiment of a system configured to index documents.

In the example shown, system 700 includes a presetting unit 710, a loading unit 720, an obtaining unit 730, a partition unit 740, a determining unit 750, and an indexing unit 760.

The presetting unit 710 is adapted to preset a filter characters list. The loading unit 720 is adapted to load the filter characters list in the presetting unit 710. The obtaining unit 730 is adapted to obtain a document to be indexed. The partition unit 740 is adapted to carry out partition operations on the document obtained by obtaining unit 730 to obtain monadic partitions. The determining unit 750 is adapted to determine whether each monadic partition is a filter character. In some embodiments, the determining unit 750 may further include a partition-traversing unit to traverse the monadic partitions and a filter character searching unit to determine whether each monadic partition is a filter character by searching the filter character list.

The indexing unit 760 is adapted to form a polynary partition by combining the monadic partition and at least one monadic partition adjacent to the monadic partition, then establish an index for the polynary partition if the monadic partition is a filter character; if the monadic partition is not a filter character, the indexing unit will establish an index for the monadic partition directly. In some embodiments, the indexing unit 760 forms a binary partition by combining a monadic partition and a monadic partition adjacent to the monadic partition; an index is established for the binary partition.

The index established by systems of document indexing above is used by systems for data querying in a search engine to carry out searching operations.

Figure 8:
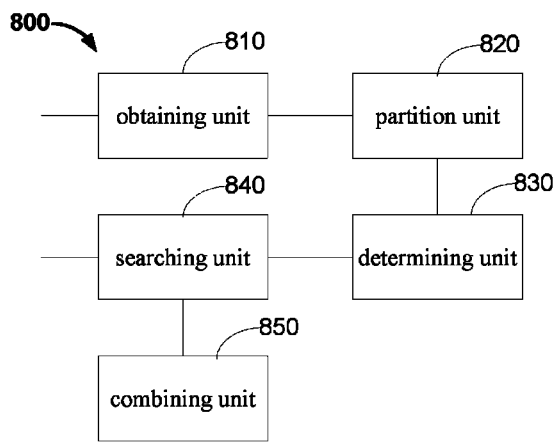
FIG. 8 is a block diagram illustrating an embodiment of a system configured to perform data querying for a search engine.

FIG. 8 is a block diagram illustrating an embodiment of a system configured to carry out data querying for a search engine. The system 800 includes an obtaining unit 810, a partition unit 820, a determining unit 830, a searching unit 840, and a combining unit 850.

The obtaining unit 810 is adapted to obtain the data to be queried. The partition unit 820 is adapted to carry out partition operations on the data obtained by the obtaining unit to obtain monadic partitions. The determining unit 830 is adapted to determine whether each monadic partition is a filter character. The searching unit 840 is adapted to form a polynary partition from a monadic partition and at least one monadic partition adjacent to the monadic partition and search the index according to the polynary partition when it is determined by the determining unit 830 that the monadic partition is a filter character; if the monadic partition is not a filer character, system 800 searches the index according to the monadic partition directly. The combining unit 850 is adapted to combine the query results obtained by the searching unit 840 after searching the index.

Figure 9:
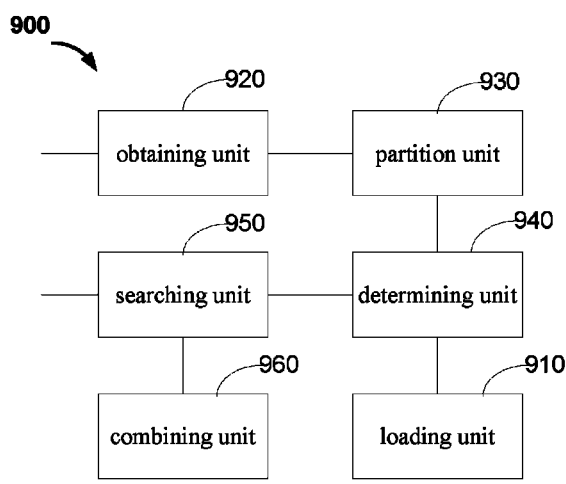
FIG. 9 is a block diagram illustrating another embodiment of a system configured to perform data querying for a search engine.

FIG. 9 is a block diagram illustrating another embodiment of a system configured to carry out data querying for a search engine. The system 900 includes a loading unit 910, an obtaining unit 920, a partition unit 930, a determining unit 940, a searching unit 950, and a combining unit 960.

The loading unit 910 is adapted to load a preset filter character list. The obtaining unit 920 is adapted to obtain the data to be queried. The partition unit 930 is adapted to carry out a partition operation on the data obtained by the obtaining unit 920 and obtain monadic partitions. The determining unit 940 is adapted to determine whether each monadic partition is a filter character. In some embodiments, the determining unit 940 may further include a partition-traversing unit which is adapted to traverse monadic partitions and a filter character searching unit which is adapted to determine whether each monadic partition is a filter character by searching the filter characters list.

The searching unit 950 is adapted to form a polynary partition by combining a monadic partition and at least one monadic partition adjacent to the monadic partition and search the index according to the polynary partition when it is determined by the determining unit 940 that the monadic partition is a filter character, or search the index according to the monadic partition when it is determined by the determining unit 940 that the monadic partition is not a filter character. In some embodiments, the searching unit 950 is adapted to form a binary partition by combining a monadic partition and a monadic partition adjacent to the monadic partition, and the searching unit searches the index according to the binary partition. The combining unit 960 is adapted to combine the query results obtained by the searching unit 950 after searching the index.

The system embodiments above convert the query of a high-frequency character into the query of a low-frequency character by forming limited polynary partitions from high-frequency monadic partitions. Therefore, the system resource used by each query can be reduced and the accuracy of the query results is not sacrificed in the mean time. The query performance of the search engine is much improved comparing to the conventional methods.

This application is described referring to the flow chart and/or block diagram of the method, system, and computer program product according to the embodiments of this application. It should be understood that each flow and/or block in the flow chart and/or block diagram and the combination of flows and/or blocks in the flow chart and/or block diagram may be realized in computer program instruction. In fact, the entire application may be described in the general context of a computer executable instruction that is executed by a computer, for example, a program module. Generally, the program module includes routines, programs, objects, components, data structures, etc., for executing a specified task or implementing a specified abstract data type. Alternatively, the present invention may be implemented in a distributed computing environment, where a remote processing device connected through a communication network executes the task. In the distributed computing environment, the program module may be located in a local or remote computer storage medium which includes a storage device Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
   generate a preset filter characters list based at least in part on a sample set of documents and appearance frequencies of monadic partitions that are present in the sample set of documents, wherein the monadic partitions comprise character text;
   obtain a document to be indexed;
   perform a monadic partition operation on the document to obtain a plurality of monadic partitions associated with the document;
   determine whether a first monadic partition of the plurality of monadic partitions associated with the document should be indexed directly or indexed with at least one other monadic partition from the plurality of monadic partitions as at least one polynary partition, wherein the determination comprises to:
      determine that the first monadic partition matches a filter character monadic partition included in the preset filter characters list;
      in response to the determination that the first monadic partition matches the filter character monadic partition, index the first monadic partition as the at least one polynary partition, including to:
         determine whether the first monadic partition precedes a second monadic partition in the plurality of monadic partitions associated with the document, wherein the second monadic partition is adjacent to the first monadic partition in the document;
         in response to a first determination that the first monadic partition precedes the second monadic partition, form a first binary partition by combining the first monadic partition with the second monadic partition;
         determine whether the first monadic partition succeeds a third monadic partition in the plurality of monadic partitions associated with the document, wherein the third monadic partition is adjacent to the first monadic partition in the document;
         in response to a second determination that the first monadic partition succeeds the third monadic partition, form a second binary partition by combining the first monadic partition with the third monadic partition; and
         add a first entry in a document index corresponding to the first binary partition and a second entry in the document index corresponding to the second binary partition, without directly indexing the first monadic partition in the document index.

2. The system of claim 1, wherein to generate the preset filter characters list based at least in part on the sample set of documents and the appearance frequencies of monadic partitions that are present in the sample set of documents comprises to:
   determine monadic partitions from the sample set of documents;
   determine an appearance frequency for each of at least a subset of the monadic partitions among the sample set of documents; and
   include a subset of the monadic partitions into the preset filter character list based at least in part on appearance frequencies corresponding to respective ones of the monadic partitions.

3. The system of claim 1, wherein the filter character monadic partition comprises a first filter character monadic partition, and wherein the processor is further configured to:
   for a fourth monadic partition in the plurality of monadic partitions associated with the document:
      determine that the fourth monadic partition does not match a second filter character monadic partition of the preset filter characters list; and
      in response to the determination that the fourth monadic partition does not match the second filter character monadic partition, add another entry in the document index corresponding to the fourth monadic partition.

4. The system of claim 1, wherein the processor is further configured to:
   determine that the first binary partition matches a filter character binary partition of the preset filter characters list;
   in response to a third determination that the first binary partition matches the filter character binary partition:
      form a ternary partition by combining the first binary partition with at least a fourth monadic partition in the plurality of monadic partitions associated with the document; and
      add a third entry in the document index corresponding to the ternary partition without directly indexing the first binary partition.

5. A method, comprising:
generating a preset filter characters list based at least in part on a sample set of documents and appearance frequencies of monadic partitions that are present in the sample set of documents, wherein the monadic partitions comprise character text;
obtaining a document to be indexed;
performing a monadic partition operation on the document to obtain a plurality of monadic partitions associated with the document;
determining whether a first monadic partition of the plurality of monadic partitions associated with the document should be indexed directly or indexed with at least one other monadic partition from the plurality of monadic partitions as at least one polynary partition, wherein the determination comprises:
   determining that the first monadic partition matches a filter character monadic partition included in the preset filter characters list;
   in response to the determination that the first monadic partition matches the filter character monadic partition, indexing the first monadic partition as the at least one polynary partition, including:
      determining whether the first monadic partition precedes a second monadic partition in the plurality of monadic partitions associated with the document, wherein the second monadic partition is adjacent to the first monadic partition in the document;

in response to a first determination that the first monadic partition precedes the second monadic partition, forming a first binary partition by combining the first monadic partition with the second monadic partition;

determining whether the first monadic partition succeeds a third monadic partition in the plurality of monadic partitions associated with the document, wherein the third monadic partition is adjacent to the first monadic partition in the document;

in response to a second determination that the first monadic partition succeeds the third monadic partition, forming a second binary partition by combining the first monadic partition with the third monadic partition; and adding a first entry in a document index corresponding to the first binary partition and a second entry in the document index corresponding to the second binary partition, without directly indexing the first monadic partition.

6. The method of claim 5, wherein generating the preset filter characters list based at least in part on the sample set of documents and the appearance frequencies of monadic partitions that are present in the sample set of documents comprises:

determining monadic partitions from the sample set of documents;

determining an appearance frequency for each of at least a subset of the monadic partitions among the sample set of documents; and including a subset of the monadic partitions into the preset filter character list based at least in part on appearance frequencies corresponding to respective ones of the monadic partitions.

7. The method of claim 5, wherein the filter character monadic partition comprises a first filter character monadic partition, and further comprising:

for a fourth monadic partition in the plurality of monadic partitions associated with the document:

determining that the fourth monadic partition does not match a second filter character monadic partition of the preset filter characters list; and in response to the determination that the fourth monadic partition does not match the second filter character monadic partition, adding another entry in the document index corresponding to the fourth monadic partition.

8. The method of claim 5, further comprising:

determining that the first binary partition matches a filter character binary partition of the preset filter characters list;

in response to a third determination that the first binary partition matches the filter character binary partition:

forming a ternary partition by combining the first binary partition with at least a fourth monadic partition in the plurality of monadic partitions associated with the document; and adding a third entry in the document index corresponding to the ternary partition without directly indexing the first binary partition.

9. A system, comprising:

a processor; and a memory coupled with the processor, wherein the memory is configured to provide the processor with instructions which when executed cause the processor to:

generate a preset filter characters list based at least in part on a sample set of documents and appearance frequencies of monadic partitions that are present in the sample set of documents, wherein the monadic partitions comprise character text;

receive a data query;

perform a monadic partition operation on the data query to obtain a plurality of monadic partitions associated with the data query;

determine whether a first monadic partition of the plurality of monadic partitions associated with the data query should be searched directly or searched with at least one other monadic partition from the plurality of monadic partitions as at least one polynary partition, wherein the determination comprises to:

determine that the first monadic partition matches a filter character monadic partition included in the preset filter characters list;

in response to the determination that the first monadic partition matches the filter character monadic partition, searching the first monadic partition as the at least one polynary partition, including to:

determine whether the first monadic partition precedes a second monadic partition in the plurality of monadic partitions associated with the data query, wherein the second monadic partition is adjacent to the first monadic partition in the data query;

in response to a first determination that the first monadic partition precedes the second monadic partition, form a first binary partition by combining the first monadic partition with the second monadic partition;

determine whether the first monadic partition succeeds a third monadic partition in the plurality of monadic partitions associated with the data query, wherein the third monadic partition is adjacent to the first monadic partition in the data query;

in response to a second determination that the first monadic partition succeeds the third monadic partition, form a second binary partition by combining the first monadic partition with the third monadic partition; and search a preset index using the first binary partition and the second binary partition, without searching the preset index directly using the first monadic partition.

10. The system of claim 9, wherein to generate the preset filter characters list based at least in part on the sample set of documents and the appearance frequencies of monadic partitions that are present in the sample set of documents comprises to:

determine monadic partitions from the sample set of documents;

determine an appearance frequency for each of at least a subset of the monadic partitions among the sample set of documents; and include a subset of the monadic partitions into the preset filter character list based at least in part on appearance frequencies corresponding to respective ones of the monadic partitions.

11. The system of claim 9, wherein the filter character monadic partition comprises a first filter character monadic partition, and wherein the processor is further configured to:
for a fourth monadic partition in the plurality of monadic partitions associated with the data query:
determine that the fourth monadic partition does not match a second filter character monadic partition of the preset filter characters list; and
in response to a third determination that the fourth monadic partition does not match the second filter character monadic partition, search the preset index directly using the fourth monadic partition to obtain a search result.

12. The system of claim 9, wherein the processor is further configured to:
determine that the first binary partition matches a filter character binary partition of the preset filter characters list;
in response to a third determination that the first binary partition matches the filter character binary partition:
form a ternary partition by combining the first binary partition with at least a fourth monadic partition in the plurality of monadic partitions associated with the data query; and
search the preset index using the ternary partition to obtain a search result corresponding to the ternary partition without searching the preset index directly using the first binary partition.

* * * * *

UNITED STATES PATENT AND TRADEMARK OFFICE
CERTIFICATE OF CORRECTION

PATENT NO. : 9,946,753 B2  
APPLICATION NO. : 14/973395  
DATED : April 17, 2018  
INVENTOR(S) : Wei et al.

It is certified that error appears in the above-identified patent and that said Letters Patent is hereby corrected as shown below:

In the Specification

In Column 2, Line 9, delete ""中国股市"" and insert --"中国股市"--, therefor.

In Column 2, Line 11, delete ""中,"" and insert --"中,"--, therefor.

In Column 2, Line 12, delete ""国," ("country,") "股"" and insert --"国," ("country,") "股"--, therefor.

In Column 2, Line 12, delete ""市,"" and insert --"市,"--, therefor.

In Column 2, Line 19, delete ""中国股市"" and insert --"中国股市"--, therefor.

In Column 2, Line 25, delete ""中国股市"" and insert --"中国股市"--, therefor.

In Column 2, Line 26, delete ""中国股"" and insert --"中国股"--, therefor.

In Column 2, Line 27, delete "市" and insert --市--, therefor.

In Column 2, Line 33, delete ""中国股市"" and insert --"中国股市"--, therefor.

In Column 2, Line 34, delete ""市"" and insert --"市"--, therefor.

In Column 2, Line 35, delete ""中国股民"" and insert --"中国股民"--, therefor.

Signed and Sealed this  
Ninth Day of October, 2018

Andrei Iancu  
*Director of the United States Patent and Trademark Office*

In Column 2, Line 36, delete ""中国股票"" and insert --"中国股票"--, therefor.

In Column 2, Line 37, delete "中国股" and insert --中国股--, therefor.

In Column 6, Line 22, delete ""中" ("market") in "中国股市"" and insert --"市" ("market") in "中国股市"--, therefor.

In Column 6, Line 24, delete ""中"" and insert --"市"--, therefor.

In Column 6, Line 61, delete ""中国人"" and insert --"中国人"--, therefor.

In Column 6, Line 63, delete ""中" ("China"), "国"" and insert --"中" ("China"), "国"--, therefor.

In Column 10, Line 4, delete ""中国股市"" and insert --"中国股市"--, therefor.

In Column 10, Line 5, delete ""中" ("Chinese"), "国" ("nation"), "股"" and insert --"中" ("Chinese"), "国" ("nation"), "股"--, therefor.